United States Patent
Gopalakrishnasetty et al.

(10) Patent No.: US 8,776,006 B1
(45) Date of Patent: Jul. 8, 2014

(54) DELAY DEFECT TESTING OF POWER DROP EFFECTS IN INTEGRATED CIRCUITS

(71) Applicant: International Business Machines Corporation, Armonk, NY (US)

(72) Inventors: Raghu G. Gopalakrishnasetty, Bangalore (IN); Thamaraiselvan Subramani, Tamilnadu (IN); Balaji Upputuri, Andhra Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/778,668

(22) Filed: Feb. 27, 2013

(51) Int. Cl.
*G06F 17/50* (2006.01)

(52) U.S. Cl.
USPC ........... 716/136; 716/100; 716/106; 716/108; 716/109; 716/110; 716/111; 716/113; 716/115; 716/132; 716/133; 716/134

(58) Field of Classification Search
USPC ......... 716/113, 115, 132–134, 136, 100, 106, 716/108–111
See application file for complete search history.

(56) References Cited

U.S. PATENT DOCUMENTS

| | | | |
|---|---|---|---|
| 6,975,978 B1 * | 12/2005 | Ishida et al. | 703/15 |
| 7,484,166 B2 | 1/2009 | Yoshida | |
| 7,877,715 B1 | 1/2011 | Thirunavukarasu et al. | |
| 8,001,437 B2 | 8/2011 | Wen et al. | |
| 8,006,156 B2 | 8/2011 | Kojima | |
| 8,051,352 B2 | 11/2011 | Lin et al. | |
| 8,051,399 B2 * | 11/2011 | Vishweshwara et al. | 716/113 |
| 8,438,528 B1 * | 5/2013 | Thirunavukarasu et al. | 716/136 |
| 2003/0212538 A1 | 11/2003 | Lin et al. | |
| 2003/0212973 A1 * | 11/2003 | Lin et al. | 716/6 |
| 2006/0106564 A1 | 5/2006 | Jain et al. | |
| 2006/0136860 A1 * | 6/2006 | Boshart et al. | 716/18 |
| 2007/0245285 A1 | 10/2007 | Wang et al. | |
| 2008/0092092 A1 * | 4/2008 | Dalton et al. | 716/4 |
| 2008/0222473 A1 | 9/2008 | Taku | |
| 2009/0177936 A1 * | 7/2009 | Koenemann et al. | 714/737 |
| 2010/0153795 A1 | 6/2010 | Goel et al. | |
| 2010/0262394 A1 | 10/2010 | Devta-Prasanna et al. | |

OTHER PUBLICATIONS

Krstic, Angela, et al., "Pattern Generation for delay testing and dynamic timing analysis considering power-supply noise effects", Mar. 2001, IEEE Transactions on computer-aided design of integrated circuits and systmes, vol. 20, No. 3, pp. 416-425.*

M. Tehranipoor et al., "Test and Diangnosis for Small-delay Effects, Chapter 2, Delay Test and Small-Delay Defects", 2011, Springer Science+Business Media, LLC, pp. 21-36.*

(Continued)

*Primary Examiner* — Stacy Whitmore

(74) *Attorney, Agent, or Firm* — Michael J. LeStrange; Hoffman Warnick LLC

(57) ABSTRACT

Aspects of the invention provide for a method of delay defect testing in integrated circuits. In one embodiment, the method includes: generating at least one test pattern based on a transition fault model type; evaluating a dynamic voltage drop for the at least one pattern during a capture cycle and generating a voltage drop value for the at least one test pattern; performing a static timing analysis, using the voltage drop value for the at least one test pattern; evaluating a plurality of paths in the at least one pattern; and masking each path that fails to meet a timing requirement.

20 Claims, 3 Drawing Sheets

(56) References Cited

OTHER PUBLICATIONS

Ahmed, N, et al., "Transition Delay Fault Test Pattern Generation Considering Supply Voltage Noise in a SOC design", 2007, ACM 978-1-59593-627-01/07/0006. 533-538.*

V.R. Devanathan & C.P. Ravikumar: "Glitch-Aware Pattern Generation and Optimization Framework for Power-Safe Scan Test," 2007, 6 pages.

J. Lee, S. Narayan, M. Kapralos, & M. Tehranipoor: "Layout-Aware, IR-Drop Tolerant Transition fault pattern generation,"2008, 6 pages.

Lin et al.: "Timing-Aware ATPG for High Quality At-speed Testing of Small Delay Defects," 2006, 8 pages.

V.R. Devanathan & C.P. Ravikumar: Variation-Tolerant, Power-Safe Pattern Generation, 2007, 11 pages.

Bosio et al., "Power-Aware Test Pattern Generation for At-Speed LOS Testing", 2011 Asian Test Symposium, IEEE Computer Society, pp. 506-510.

Ahmed et al., "Transition Delay Fault Test Pattern Generation Considering Supply Voltage Noise in a SOC Design", DAC 2007, Jun. 4-8, 2007, San Diego, California, USA, pp. 533-538.

Ahmed et al., "Supply Voltage Noise Aware ATPG for Transition Delay Faults", 25th IEEE VLSI Test Symmposium, 2007, 6 pages.

* cited by examiner

DELAY DEFECT TESTING OF POWER DROP EFFECTS IN INTEGRATED CIRCUITS

BACKGROUND OF THE INVENTION

The subject matter disclosed herein relates generally to the design of integrated circuits. More specifically, the disclosure provided herein relates to testing of integrated circuit designs.

Shrinking technology, along with increasing design density and frequency, has posed serious design and test challenges. One important issue of structural testing of integrated circuits in today's high-speed designs is the increasing number of types of timing-related defects and also dynamic and static voltage drops.

Among existing delay test models, the transition fault model is widely practiced in the industry to test delay-induced defects in integrated circuits. There are enhancements to these testing models which improve the quality of transition delay patterns; these enhancements are considered a cost-effective alternative to functional pattern generation. However, the at-speed launch and capture, and large number of switching events in the circuit during this transition delay testing may cause excessive peak power and large voltage drops.

The effect of these voltage drops have become increasingly more significant in recent years, as the effects during automatic test pattern generation (ATPG) pose design, test, and reliability challenges for chip manufacturers. This situation has grown more and more complicated with reductions in supply voltage and limitations on the further reduction of threshold voltages. As a result, the voltage drop may reduce cell noise immunity and may also lead to functional failures, in some cases.

BRIEF DESCRIPTION OF THE INVENTION

Aspects of the invention provide for a method of delay defect testing in integrated circuits which considers power drop effects (e.g., dynamic voltage drops) on circuit performance. In one embodiment, the method includes: generating at least one test pattern based on a transition fault model type; evaluating a dynamic voltage drop for the at least one pattern during a capture cycle and generating a voltage drop value for the at least one test pattern; performing a static timing analysis, using the voltage drop value for the at least one test pattern; evaluating a plurality of paths in the at least one pattern; and masking each path that fails to meet a timing requirement.

A first aspect of the invention provides a method of delay defect testing in integrated circuits, the method comprising: generating at least one test pattern based on a transition fault model type; evaluating a dynamic voltage drop for the at least one pattern during a capture cycle and generating a voltage drop value for the at least one test pattern; performing a static timing analysis, using the voltage drop value for the at least one test pattern; evaluating a plurality of paths in the at least one pattern; and masking each path that fails to meet a timing requirement.

A second aspect of the invention provides a computer-readable medium, which when executed, enables a computer system to implement a method for delay defect testing in integrated circuits, the method comprising: generating at least one test pattern based on a transition fault model type; evaluating a dynamic voltage drop for the at least one pattern during a capture cycle and generating a voltage drop value for the at least one test pattern; performing a static timing analysis, using the voltage drop value for the at least one test pattern; evaluating a plurality of paths in the at least one pattern; and masking each path that fails to meet a timing requirement.

A third aspect of the invention provides a computer system, comprising: at least one computing device configured to perform a method of delay defect testing in integrated circuits by: generating at least one test pattern based on a transition fault model type; evaluating a dynamic voltage drop for the at least one pattern during a capture cycle and generating a voltage drop value for the at least one test pattern; performing a static timing analysis, using the voltage drop value for the at least one test pattern; evaluating a plurality of paths in the at least one pattern; and masking each path that fails to meet a timing requirement.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates generally to the design of integrated circuits. More specifically, the disclosure provided herein relates to testing of integrated circuit designs.

Shrinking technology, along with increasing design density and frequency, has posed serious design and test challenges. One important issue of structural testing of integrated circuits in today's high-speed designs is the increasing number of types of timing-related defects and also dynamic and static voltage drops.

Among existing delay test models, the transition fault model is widely practiced in the industry to test delay-induced defects. There are enhancements to the testing models to improve the quality of transition delay patterns that are considered a cost-effective alternative to functional pattern generation. However, the at-speed launch and capture, and large number of switching events in the circuit during the transition delay testing causes excessive peak power and large voltage drops.

Voltage drops have become increasingly more significant in recent years, as the effects during automatic test pattern generation (ATPG) poses design, test, and reliability challenges for chip manufacturers. This situation has grown more and more complicated with reductions in supply voltage and limitations on the further reduction of threshold voltages. The voltage drop reduces the cell's noise immunity and may also lead to functional failures, in some cases.

Aspects of the invention provide for a method of delay defect testing in integrated circuits. In one embodiment, the method includes: generating at least one test pattern based on a transition fault model type (e.g., an alternating current (AC) fault model type); evaluating a dynamic voltage drop for the at least one pattern during a capture cycle and generating a voltage drop value for the at least one test pattern; performing a static timing analysis (STA) (e.g., a Voltage Aware Static Timing Analysis), using the voltage drop value for the at least one test pattern; evaluating a plurality of paths in the at least one pattern; and masking each path that fails to meet a timing requirement.

As indicated above, aspects of the invention provide for delay defect testing in integrated circuits. As used herein, unless otherwise noted, the term "set" means one or more (i.e., at least one) and the phrase "any solution" means any now known or later developed solution.

Figure 1:
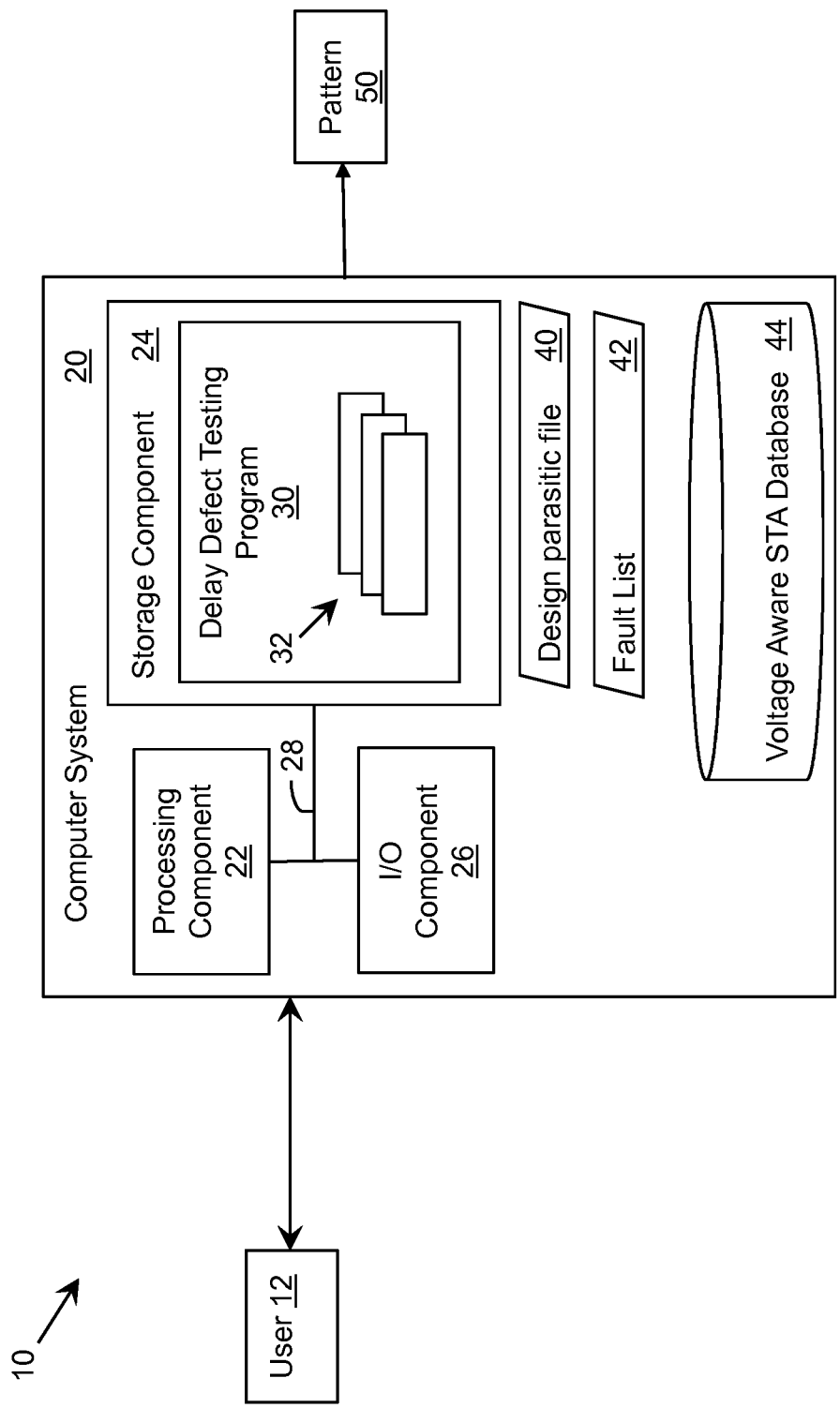
FIG. 1 shows an illustrative environment according to embodiments of the invention.

Turning to the drawings, FIG. 1 shows an illustrative environment 10 for delay defect testing of power drop effects in an integrated circuit according to an embodiment. To this extent, environment 10 includes a computer system 20 that can perform a process described herein in order to perform delay defect testing of integrated circuits. In particular, computer system 20 is shown including a delay defect testing program 30, which makes computer system 20 operable to perform scan element distribution for an integrated circuit by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as delay defect testing program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, delay defect testing program 30 can manage a set of interfaces (e.g., graphical user interface(s), application program interface, and/or the like) that enable human and/or system users 12 to interact with delay defect testing program 30. Further, delay defect testing program 30 can manage (e.g., store, retrieve, create, manipulate, organize, present, etc.) the data, such as a design parasitic file 40 or a fault list 42, using any solution.

In any event, computer system 20 can comprise one or more general purpose computing articles of manufacture (e.g., computing devices) capable of executing program code, such as delay defect testing program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, delay defect testing program 30 can be embodied as any combination of system software and/or application software.

Further, delay defect testing program 30 can be implemented using a set of modules 32. In this case, a module 32 can enable computer system 20 to perform a set of tasks used by delay defect testing program 30, and can be separately developed and/or implemented apart from other portions of delay defect testing program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of delay defect testing program 30 fixed thereon (e.g., one or more modules 32). However, it is understood that computer system 20 and delay defect testing program 30 are only representative of various possible equivalent computer systems that may perform a process described herein. To this extent, in other embodiments, the functionality provided by computer system 20 and delay defect testing program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, delay defect testing program 30 enables computer system 20 to perform delay defect testing of power drop effects (e.g., spare latch distribution) in an integrated circuit. To this extent, computer system 20 may perform the method according to aspects of the invention, as will be described herein with respect to FIG. 3 and reference to FIGS. 1-2.

Figure 2:
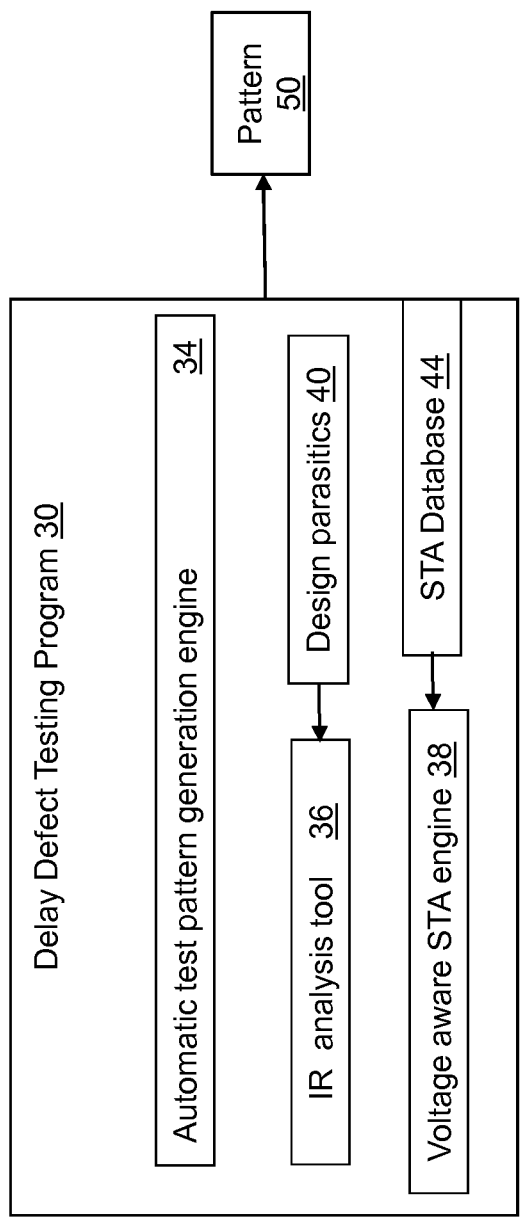
FIG. 2 shows a block diagram of the delay defect testing program according to embodiments of the invention.

Turning now to FIG. 2, a block diagram of a defect delay testing program 30 according to embodiments of the invention is shown. Delay defect testing program 30 includes an automatic test pattern generation (ATPG) engine 34, a voltage (e.g., IR) analysis tool 36 which is connected to design parasitic file 40, and a Voltage Aware Static Timing Analysis (VASTA) engine 38 which is connected to STA Database 44 which includes libraries (libs) for voltage aware static analysis. The combination of these features of defect delay testing program 30 aid in generating a final set of test patterns 50 using design parasitic file 40 and libraries (libs) for voltage aware static timing analysis stored on STA Database 44. In an embodiment, libs stored on STA Database 44 may represent static timing models for cells and modules.

Figure 3:
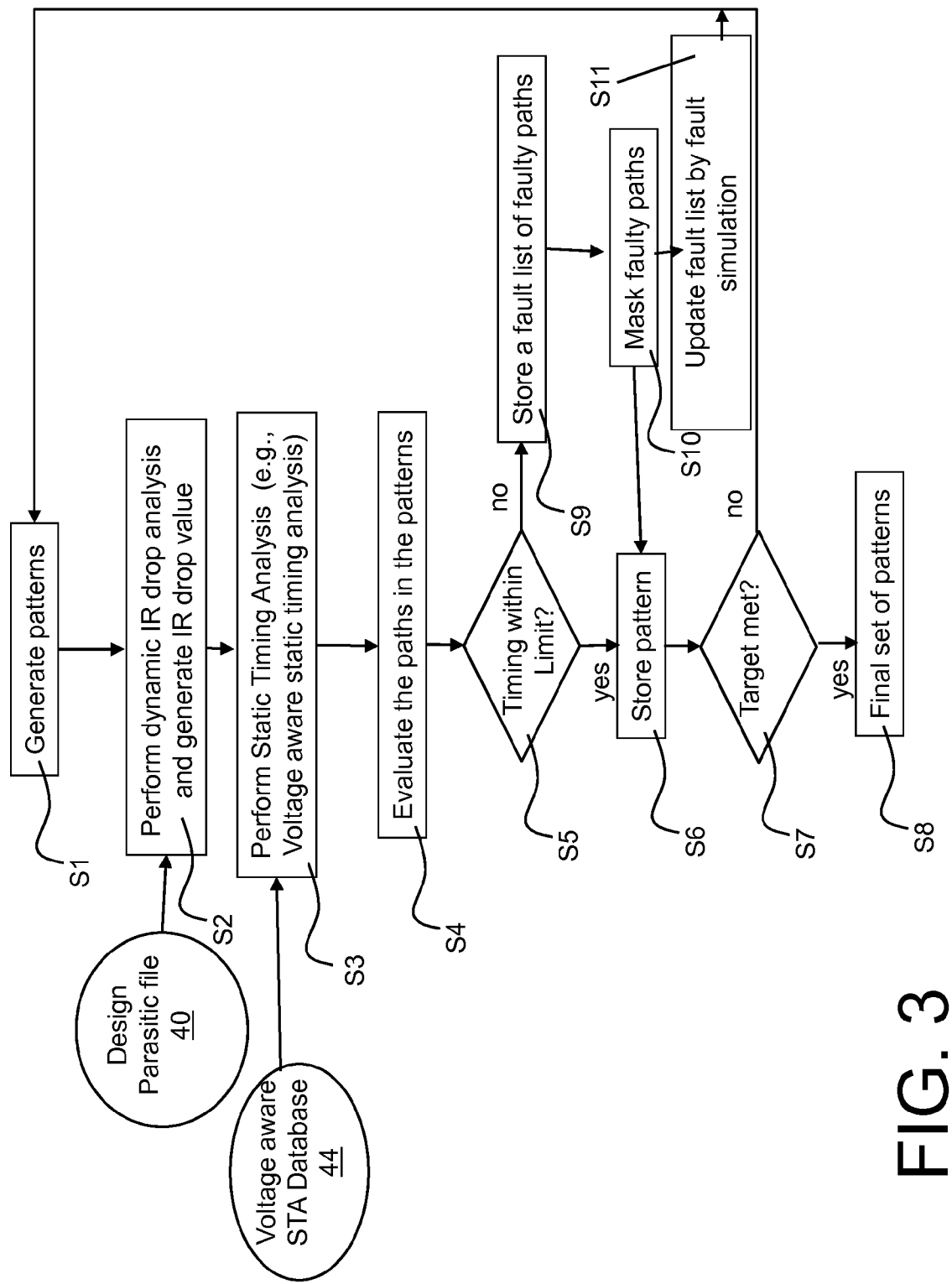
FIG. 3 shows a flow diagram of a method according to embodiments of the invention.

Turning now to FIG. 3, and with reference to FIGS. 1 and 2, a flow diagram of a method of defect delay testing according to embodiments of the invention is shown. At S1, ATPG engine 34 generates at least one pattern for an integrated circuit based on a transition fault model type (e.g., an alternating current (AC) fault model type). ATPG engine 34 may generate only one pattern or a plurality of patterns. In an embodiment, ATPG engine 34 may generate patterns by processing the voltage drop on every instance in the design.

Next, at S2, a dynamic voltage drop for the at least one pattern during a capture cycle is evaluated and a voltage drop value for the at least one test pattern is generated via the voltage analysis tool 36 (e.g., an IR analysis tool). The voltage analysis tool 36 may utilize a design parasitic file 40 which may include the parasitic data of wires in the integrated circuit, such as, the resistance, capacitance, and the inductance of the wires. Design parasitic file 40, as known in the art, is used for delay calculations and ensuring signal integrity. The design parasitic file 40 may be in standard parasitic exchange format (SPEF), or any other format.

At S3, a static timing analysis (e.g., a Voltage Aware Static Timing Analysis) is performed, using the voltage drop value that is generated for the at least one pattern via a voltage aware timing analysis engine 38. The voltage aware timing analysis engine 38 utilizes the voltage aware timing library on STA Database 44 in performing the timing analysis. The voltage aware timing analysis engine 38 evaluates, at S4, each of the paths within the at least one pattern set and determines whether, at S5, each path meets a timing requirement (e.g., a desired time parameter for the integrated circuit). If the timing requirement is met, yes at S5, the at least one pattern set is stored (S6).

Once the delay defect testing program 30 stores the at least one pattern in S6, delay defect testing program 30 may determine whether a target for the pattern is met at S7. If yes, (a target for the pattern is met at S7), then at S8, the pattern is added to a final set of patterns to use for delay defect testing that accurately estimates and controls voltage drop within the ATPG engine for testing integrated circuits.

At S9, if the timing requirement is not met by at least one of the paths within the at least one pattern, the faulty paths are stored in a fault list 42 (FIG. 1). Then, at S10, these faulty paths are masked, and then the pattern is stored (S6) and the fault list is updated by the fault simulation at S11 and reevaluated by returning to S1.

While shown and described herein as a method and system for delay defect testing of integrated circuits, it is understood that aspects of the invention further provide various alternative embodiments. For example, in one embodiment, the invention provides a computer program fixed in at least one computer-readable medium, which when executed, enables a computer system to perform scan element distribution for an integrated circuit. To this extent, the computer-readable medium includes program code, such as delay defect testing program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as delay defect testing program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for delay defect testing of integrated circuits. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to perform scan element distribution for an integrated circuit as described herein. In this case, the service provider can manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of delay defect testing in integrated circuits performed on at least one computing device, the method comprising:

generating at least one test pattern based on a transition fault model type;

evaluating a dynamic voltage drop for the at least one pattern during a capture cycle and generating a dynamic voltage drop value for the at least one test pattern;

performing a static timing analysis, based entirely upon the dynamic voltage drop value for the at least one test pattern using the at least one computing device;

evaluating a plurality of paths in the at least one pattern; and masking each path that fails to meet a timing requirement based upon the dynamic voltage drop value.

2. The method of claim 1, further comprising:
storing the at least one test pattern, in response to each path meeting the timing requirement, wherein the transition fault model type is an alternating current fault model type.

3. The method of claim 2, further comprising:
determining whether a target timing requirement for the at least one test pattern is met, wherein the static timing analysis is a voltage aware static timing analysis.

4. The method of claim 1, further comprising:
storing the paths that fail to meet the timing requirement in a fault list;
fault simulating the at least one test pattern including the masked paths to evaluate the fault list; and
submitting the fault list for test pattern generation.

5. The method of claim 1, wherein evaluating the dynamic voltage drop for the at least one pattern further comprises utilizing a design parasitic file.

6. The method of claim 5, wherein performing the static timing analysis further comprises utilizing a plurality of libraries for voltage aware static timing analysis (STA).

7. The method of claim 1, further comprising a pattern suite including a plurality of patterns.

8. A non-transitory computer-readable medium, which when executed, enables a computer system to implement a method for delay defect testing in integrated circuits, the method comprising:
generating at least one test pattern based on a transition fault model type;
evaluating a dynamic voltage drop for the at least one pattern during a capture cycle and generating a dynamic voltage drop value for the at least one test pattern;
performing a static timing analysis, based entirely upon the dynamic voltage drop value for the at least one test pattern;
evaluating a plurality of paths in the at least one pattern; and
masking each path that fails to meet a timing requirement based upon the dynamic voltage drop value.

9. The computer-readable medium of claim 8, wherein the method further comprises:
storing the at least one test pattern, in response to each path meeting the timing requirement, wherein the transition fault model type is an alternating current transition fault model type.

10. The computer-readable medium of claim 9, wherein the method further comprises:
determining whether a target for the at least one test pattern is met, wherein the static timing analysis is a voltage aware static timing analysis.

11. The computer-readable medium of claim 8, wherein the method further comprises:
storing the paths that fail to meet the timing requirement in a fault list;
fault simulating the at least one test pattern including the masked paths to evaluate the fault list; and
submitting the fault list for test pattern generation.

12. The computer-readable medium of claim 8, wherein evaluating the dynamic voltage drop for the at least one pattern further comprises utilizing a design parasitic file.

13. The computer-readable medium of claim 12, wherein performing the static timing analysis further comprises utilizing a plurality of libraries for voltage aware static timing analysis.

14. The computer-readable medium of claim 8, further comprising a pattern suite including a plurality of patterns.

15. A computer system, comprising:
at least one computing device configured to perform a method of delay defect testing in integrated circuits by:
generating at least one test pattern based on a transition fault model type;
evaluating a dynamic voltage drop for the at least one pattern during a capture cycle and generating a dynamic voltage drop value for the at least one test pattern;
performing a static timing analysis, based entirely upon the dynamic voltage drop value for the at least one test pattern;
evaluating a plurality of paths in the at least one pattern; and
masking each path that fails to meet a timing requirement based upon the dynamic voltage drop value.

16. The computer system of claim 15, the method further comprising:
storing the at least one test pattern, in response to each path meeting the timing requirement; and
determining whether a target for the at least one test pattern is met, wherein the transition fault model type is an alternating current transition fault model type.

17. The computer system of claim 15, the method further comprising:
storing the paths that fail to meet the timing requirement in a fault list;
fault simulating the at least one test pattern including the masked paths to evaluate the fault list; and
submitting the fault list for test pattern generation.

18. The computer system of claim 15, wherein evaluating the dynamic voltage drop for the at least one pattern further comprises utilizing a design parasitic file, and
wherein the static timing analysis is a voltage aware static timing analysis.

19. The computer system of claim 18, wherein performing the static timing analysis further comprises utilizing a plurality of libraries for voltage aware static timing analysis.

20. The computer system of claim 15, the method further comprising a pattern suite including a plurality of patterns.

* * * * *